United States Patent
Ozawa

(10) Patent No.: US 9,245,528 B2
(45) Date of Patent: Jan. 26, 2016

(54) COMMUNICATION SYSTEM, METHOD, AND APPARATUS

(75) Inventor: Kazunori Ozawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 508 days.

(21) Appl. No.: 13/701,322

(22) PCT Filed: May 31, 2011

(86) PCT No.: PCT/JP2011/062467
§ 371 (c)(1),
(2), (4) Date: Nov. 30, 2012

(87) PCT Pub. No.: WO2011/152389
PCT Pub. Date: Dec. 8, 2011

(65) Prior Publication Data
US 2013/0085750 A1 Apr. 4, 2013

(30) Foreign Application Priority Data
Jun. 4, 2010 (JP) ................. 2010-128875

(51) Int. Cl.
*H04W 4/00* (2009.01)
*G10L 19/00* (2013.01)
*H04N 21/2343* (2011.01)
*H04N 21/414* (2011.01)
*G10L 19/16* (2013.01)

(52) U.S. Cl.
CPC ........ *G10L 19/00* (2013.01); *H04N 21/234309* (2013.01); *H04N 21/41407* (2013.01); *G10L 19/173* (2013.01)

(58) Field of Classification Search
CPC .............. H04N 21/44; H04N 12/4402; H04N 21/4621; H04N 21/41407; H04N 21/234309
USPC ......................................... 370/329
See application file for complete search history.

(56) References Cited

U.S. PATENT DOCUMENTS 7,882,172 B2    2/2011   Kodaka et al.
2004/0036812 A1 2/2004  Ueda et al.
2005/0034166 A1 2/2005  Kim et al.

FOREIGN PATENT DOCUMENTS

| JP | 2004-056777 | 2/2004 |
| JP | 2005-057771 | 3/2005 |
| JP | 2005-277654 | 10/2005 |
| JP | 2007-311957 | 11/2007 |

OTHER PUBLICATIONS

International Search Report, PCT/JP2011/062467, Jul. 26, 2011.
JP Office Action dated Jan. 14, 2014, with partial English Translation; Application No. 2012-518397.

*Primary Examiner* — Sai-Ming Chan
(74) *Attorney, Agent, or Firm* — Young & Thompson

(57) ABSTRACT

A server apparatus acquires content based on instruction information; decodes image data of the acquired content compression encodes captured image data using a predetermined encoding scheme; decodes an audio signal and compression encodes the decoded audio signal using the predetermined encoding scheme, stores the image and the audio signal and sends the packet to a packet forwarding apparatus. A mobile terminal receives the packet, decodes and displays the compression encoded image data stored in the packet; and decodes and reproduces the compression encoded audio signal.

17 Claims, 4 Drawing Sheets

COMMUNICATION SYSTEM, METHOD, AND APPARATUS

CROSS-REFERENCE TO RELATED APPLICATIONS)

This application is based upon and claims the benefit of the priority of Japanese patent application No. 2010-128875 filed on Jun. 4, 2010, the disclosure of which is incorporated herein in its entirety by reference thereto.

TECHNICAL FIELD

The present invention relates to a communication system, and more particularly to a system, method, and apparatus suitable for a remote mobile communication system in which a mobile terminal communicates with a virtual client on a server.

BACKGROUND

With the increase in speed and capacity of a mobile network brought about by the introduction of a technology such as LTE (Log Term Evolution) or EPC (Evolved Packet Core), new services that utilize the high speed and large capacity of a network, such as a 3D high-definition game, a large-scale database search, an image recognition/matching, a high-definition video (still image, moving image, etc.), a high-quality audio, and a 3D audio, are expected to be created in future.

Patent Literature 1 discloses a system including a mobile phone terminal connected to a voice network and a data network, a virtual terminal apparatus connected to the voice network and the data network, and the other party's communication apparatus connected to the virtual terminal apparatus. The virtual terminal apparatus includes an application processing unit that interprets user data received from the other party's communication apparatus and divides the received user data into the voice signal and the image signal, a virtual screen unit that expands the image signal into a virtual screen, and a synchronization processing unit that adds the synchronization signal to the voice signal and the image signal, sends the voice signal to the voice network, and sends the image signal to the data network. The mobile phone terminal includes a synchronization processing unit that synchronizes the voice signal received via the voice network with the image signal received via the data network, a voice apparatus unit that produces the sound of the voice signal, and an image apparatus unit that displays the image signal.

CITATION LIST

Patent Literature

PTL 1:
Japanese Patent Kokai Publication No. JP2005-277654A

SUMMARY

The analysis of related technology is given below.

As is often the case with conventional services, an existing mobile terminal cannot cope with a new service introduced by an operator. To cope with the new service, a user must buy a new mobile terminal to replace an old one, or purchase a new mobile terminal, or modify the existing terminal in time for start of the new service.

With regard to content including moving-image content or audio, when a new compression encoding scheme is introduced for compression encoding of content with the advance in codec technology, a new compression encoding system, as well as a decoder to decode the content encoded by the new compression encoding, is required on a terminal. This means that a new terminal compatible with a new compression encoding scheme is required. An existing terminal, if not modified, cannot decode the content.

In view of the foregoing, it is an object of the present invention to provide a communication system, method, and apparatus that eliminates the need to prepare a new terminal or modify an existing terminal for a newly introduced service.

According to the present invention, there is provided a communication system, comprising:

a server apparatus including first to Nth (N is an integer equal to or larger than 2) virtual client units, wherein the first to Nth virtual client units are connected respectively to first to Nth mobile terminals via a packet forwarding apparatus on a mobile network, each of the virtual client units receives instruction information from the mobile terminal via the packet forwarding apparatus, runs an application, based on the instruction information, to generate a screen and compression encodes a part or whole of the screen using an image encoder, once decodes an audio signal, associated with the application or a content file, and compression encodes a part or whole of the decoded audio signal again using a predetermined audio encoder, and stores the compression encoded result in a packet and sends the packet to the packet forwarding apparatus and wherein the mobile terminal receives the packet via the mobile network, decodes the compression encoded result, stored in the packet, using a screen decoder and displays a screen, and decodes the compression encoded result using an audio decoder and reproduces the decoded result.

A communication system according to the present invention comprises a server apparatus connected to a plurality of mobile terminals via a packet forwarding apparatus on a mobile network wherein, for each of the mobile terminals, the server apparatus comprises a control signal sending/receiving unit that receives instruction information from the mobile terminal via the packet forwarding apparatus and, based on the instruction information, acquires corresponding content; an image decoder unit that decodes compression encoded image data of the content acquired by the control signal sending/receiving unit; a screen capture unit that captures a part or whole of a decoded screen with a predetermined resolution; an image encoder unit that compression encodes the image data, captured by the screen capture unit, using a predetermined compression encoding scheme; an audio decoder unit that determines whether a compression encoded audio signal, included in the content, is compression encoded using the predetermined compression encoding scheme, once decodes the audio signal if the compression encoding scheme is not the predetermined compression encoding scheme, and skips the decoding and the compression encoding of the audio signal and sends the audio signal to a packet sending unit if the compression encoding scheme is the predetermined compression encoding scheme; an audio encoder unit that compression encodes the audio signal, decoded by the audio decoder unit, using the predetermined compression encoding scheme; and the packet sending unit that stores the image data, compression encoded using the predetermined compression encoding scheme, and the audio signal, compression encoded using the predetermined compression encoding scheme, in a packet and sends the packet to the packet forwarding apparatus and wherein the mobile terminal receives the packet via the mobile network, decodes image data, stored in the packet and compression encoded using the predetermined compression encoding scheme, using an image decoder of the mobile terminal and decodes an audio signal, compression encoded using the predetermined compression encoding scheme, using an audio decoder of the mobile terminal.

According to the present invention, the mobile network is a mobile packet network or a mobile LTE/EPC network.

According to the present invention, there is provided a server apparatus connected to a plurality of mobile terminals via a packet forwarding apparatus on a mobile network, the server apparatus comprising, for each of the mobile terminals:

a control signal sending/receiving unit that receives instruction information from the mobile terminal via the packet forwarding apparatus and, based on the instruction information, acquires corresponding content;

an image decoder unit that decodes compression encoded image data of the content acquired by the control signal sending/receiving unit;

a screen capture unit that captures a part or whole of a screen, decoded by the image decoder, with a predetermined resolution;

an image encoder unit that compression encodes the image data, captured by the screen capture unit, using a predetermined compression encoding scheme;

an audio decoder unit that determines whether an audio signal, included in the content, is compression encoded using the predetermined compression encoding scheme, once decodes the audio signal if the compression encoding scheme is not the predetermined compression encoding scheme, and skips the decoding and the compression encoding of the audio signal and sends the audio signal to a packet sending unit if the compression encoding scheme is the predetermined compression encoding scheme;

an audio encoder unit that compression encodes the audio signal, decoded by the audio decoder unit, using the predetermined compression encoding scheme; and the packet sending unit that stores the image data, compression encoded using the predetermined compression encoding scheme, and the audio signal, compression encoded using the predetermined compression encoding scheme, in a packet and sends the packet to the packet forwarding apparatus. According to the present invention, the server apparatus may configure a thin client server with the mobile terminal as a thin client.

According to the present invention, there is provided a communication method, performed by a server apparatus connected to a plurality of mobile terminals via a packet forwarding apparatus on a mobile network, the communication method comprising, for each of the mobile terminals, the steps of:

receiving instruction information from the mobile terminal via the packet forwarding apparatus;

acquiring corresponding content based on the instruction information;

decoding compression encoded image data of the acquired content;

capturing a part or whole of a decoded screen with a predetermined resolution;

compression encoding the captured image data using a predetermined compression encoding scheme;

determining whether a compression encoded audio signal, included in the content, is compression encoded using the predetermined compression encoding scheme, once decoding the audio signal if the compression encoding scheme is not the predetermined compression encoding scheme and compression encoding the decoded audio signal using the predetermined compression encoding scheme, and skipping the decoding and the compression encoding of the audio signal if the compression encoding scheme is the predetermined compression encoding scheme; and storing the image, compression encoded using the predetermined compression encoding scheme, and the audio signal, compression encoded using the predetermined compression encoding scheme, in a packet and sending the packet to the packet forwarding apparatus, the communication method further comprising the steps, performed by the mobile terminal, of:

receiving the packet via the mobile network; decoding the image data, stored in the packet and compression encoded using the predetermined compression encoding scheme, and then displaying a screen; and decoding the audio signal, compression encoded using the predetermined compression encoding scheme, and reproducing the decoded audio signal.

The present invention eliminates the need for purchasing a new terminal or for modifying an existing terminal to cope with a new service.

MODES

Figure 1:
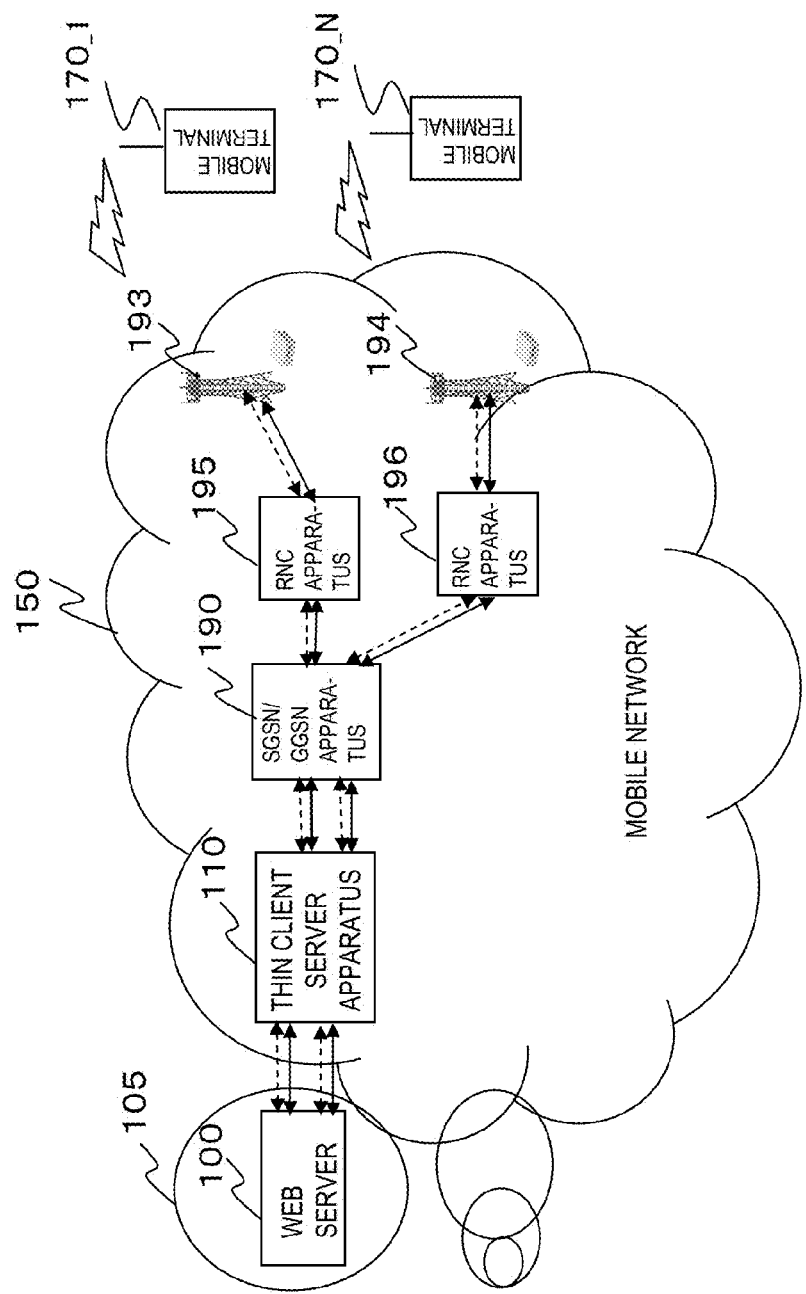
FIG. 1 is a diagram illustrating the configuration of a first exemplary embodiment of the present invention.

The following describes exemplary embodiments of the present invention. FIG. 1 is a diagram illustrating a configuration of a first exemplary embodiment of the present invention. In FIG. 1, there is shown the configuration in which a mobile packet network is used as a mobile network 150 and an SGSN/GGSN apparatus 190 is used as a packet forwarding apparatus. The SGSN/GGSN apparatus is an apparatus in which an SGSN (Serving GPRS (general packet radio service) Support Node) apparatus and a GGSN (Gateway GPRS (general packet radio service) Support Node) apparatus for use on a 3G radio access network are integrated. The GGSN is a node that performs interconnection with a packet data network. The SGSN is an exchange node that performs location management, security management, and access control of GPRS users.

In FIG. 1, a first mobile terminal 170_1 sends an instruction signal via a base station apparatus 193, an RNC (Radio Network Controller) apparatus 195, and the SGSN/GGSN apparatus 190 to a thin client server apparatus 110, which is a server of a virtual machine system arranged on the mobile network 150 in order to connect to a first virtual client unit of the thin client server apparatus 110 to browse content in a web server 100 on the Internet 105 through the operation of the first virtual client unit.

Similarly, in order to connect to an Nth virtual client of the thin client server apparatus 110, arranged on the mobile network 150 for operating the Nth virtual client, an Nth mobile terminal 170_N sends an instruction signal via the base station apparatus 194, the RNC apparatus 196, and the SGSN/GGSN apparatus 190 to the thin client server apparatus 110.

N is a positive integer equal to or larger than 2. The mobile terminal is not only a mobile phone terminal but may be any mobile terminal, such as a multiple-function mobile terminal, connected to the mobile network 150.

The instruction signal is a signal that is generated by key operation or special character input performed on the mobile terminal 170_1 and sent from the mobile terminal 170_1.

The instruction signal sent from the mobile terminal 170_1 arrives at the apparatuses on the mobile network 150 in the order of the base station apparatus 193, the RNC (Radio Network Controller) apparatus 195, the SGSN/GGSN apparatus 190, and the thin client server apparatus 110 and the thin client server apparatus 110 receives the instruction signal. Similarly, the instruction signal sent from the mobile terminal 170_N arrives at the apparatuses on the mobile network 150 in the order of the base station apparatus 194, the RNC apparatus 196, the SGSN/GGSN apparatus 190, and the thin client server apparatus 110, and the thin client server apparatus 110 receives the instruction signal. Although a known protocol may be used as the protocol of the instruction signal, it is assumed in this exemplary embodiment that TCP/IP (Transmission Control Protocol/Internet Protocol) is used and that HTTP (Hyper Text Transport Protocol) is used in the higher layer. Besides HTTP, other protocols such as SIP (Session Initiation Protocol) may also be used.

Figure 2:
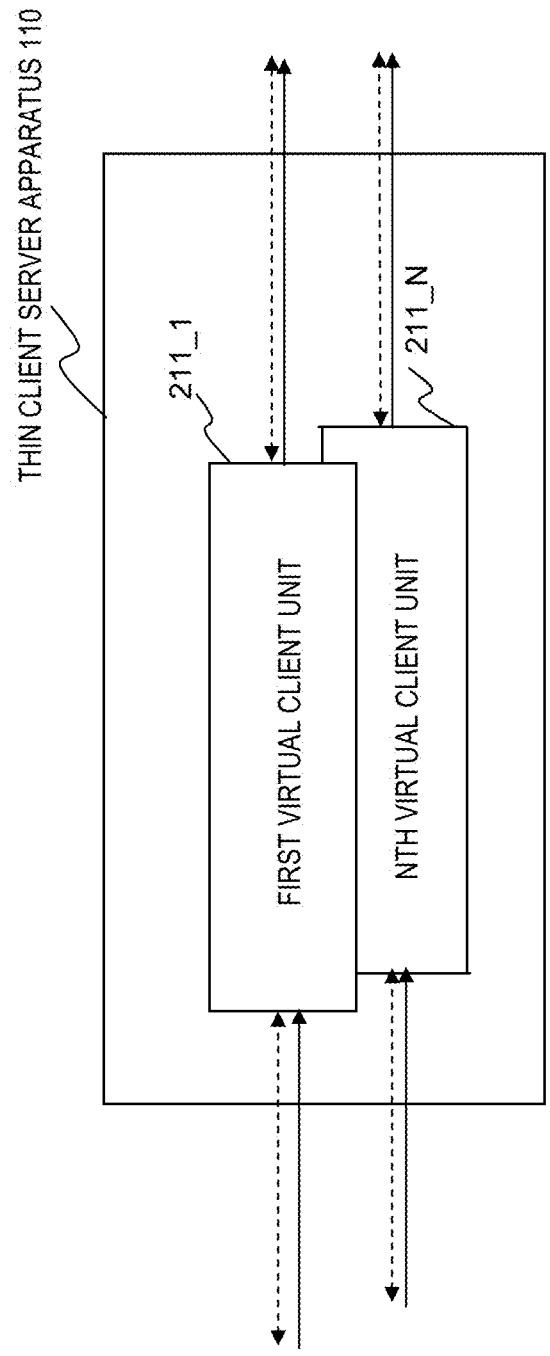
FIG. 2 is a diagram illustrating the configuration of a thin client server apparatus in FIG. 1.

FIG. 2 is a diagram illustrating a configuration of the thin client server apparatus 110 according to this exemplary embodiment. Although not limited thereto, the mobile terminal functions as a thin client that includes the minimum network function to connect to the server and the means for allowing the user to perform input/output. The server (thin client server) uses a virtual machine system to cause a plurality of virtual machines to run on a server OS (Operating System) and to make it appear to each user (mobile terminal) as if a virtual client unit is operating. Because the virtual client function is provided for each of the N mobile terminals, the thin client server apparatus 110 has N virtual client units 211_1 to 211_N (where, N≥2).

The following describes the case in which the first mobile terminal 170_1 connects to a first virtual client unit and the Nth mobile terminal 170_N connects to an Nth virtual client unit. That is, the first virtual client unit 211_1 connects to the first mobile terminal 170_1, and an Nth virtual client unit 211_N connects to the Nth mobile terminal 170_N.

In FIG. 2, the virtual client unit 211_1 sends and receives control signals (broken line in FIG. 2), such as the instruction signal from the mobile terminal 170_1, to and from the SGSN/GGSN apparatus 190 and, at the same time, outputs data signals (solid line in FIG. 2), such as a screen compression encoded signal or an audio compression encoded signal, to the mobile terminal 170_1.

Figure 3:
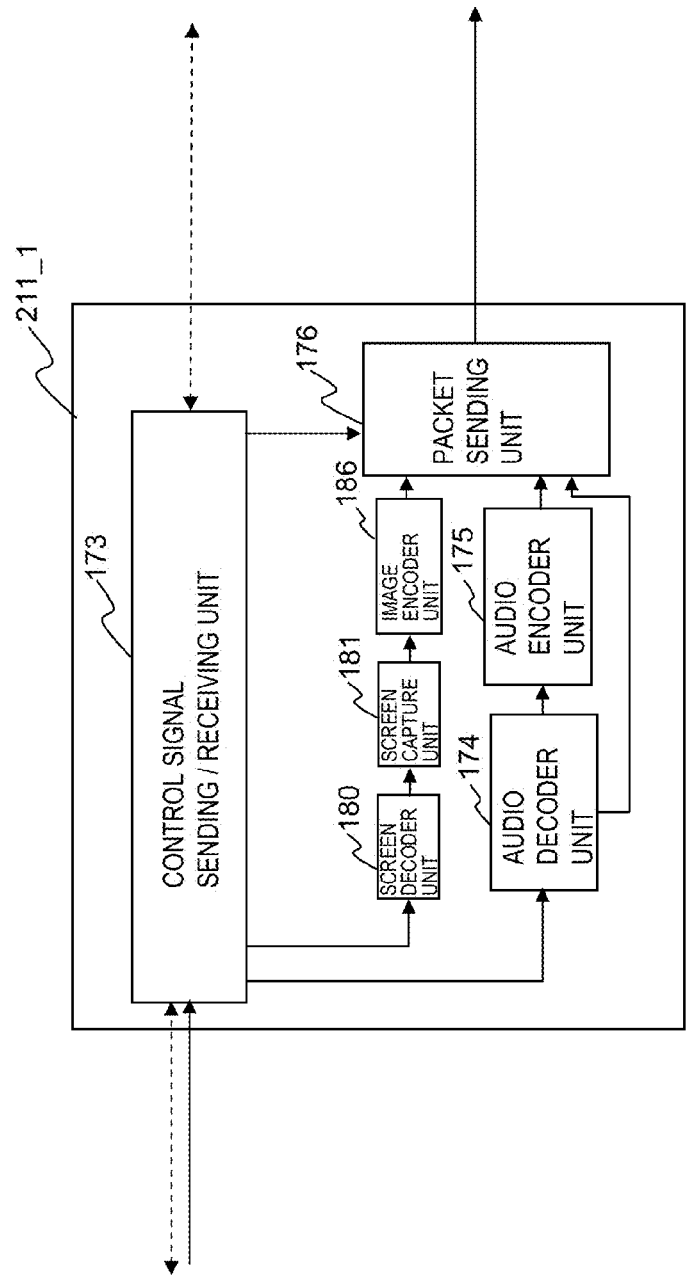
FIG. 3 is a diagram illustrating the configuration of a virtual client unit in FIG. 1.

FIG. 3 is a diagram illustrating a configuration of the virtual client unit 211_1 of the thin client server apparatus 110 in FIG. 2. Because the block configuration of virtual client units 211_2 to 211_N is the same as that of the virtual client unit 211_1, the description of the configuration of those virtual client units is omitted.

In FIG. 3, a control signal sending/receiving unit 173 receives the instruction signal from the mobile terminal 170_1 via the SGSN/GGSN apparatus 190. Here, it is assumed that the instruction signal is an instruction signal to start an application used to browse a moving-image content site with a web server apparatus 100 on the Internet 105.

In response to the instruction signal, the control signal sending/receiving unit 173 connects to the web server on the Internet that has a URL (Uniform Resource Locator) or IP address of the connection destination stored in the instruction signal.

The control signal sending/receiving unit 173 downloads a moving-image content file from the web server 100, outputs the image data (compression encoded moving-image data), stored in the moving-image content file, to an image decoder unit 180, and outputs audio data (compression encoded audio data) to an audio decoder unit 174.

The image decoder unit 180 decodes the moving-image data of the moving-image content and outputs the decoded data to a screen capture unit 181, one screen at a time.

The screen capture unit 181 captures a part or the entirety of the screen with a predetermined screen resolution and outputs the captured screen to an image encoder unit 186.

The image encoder unit 186 performs compression encoding of the output image data, received from the screen capture unit 181, using a predetermined compression encoding scheme and outputs the compression encoded image data to a packet sending unit 176.

The audio decoder unit 174 determines whether the audio data included in the moving-image content is compression encoded using the predetermined compression encoding scheme (for example, analyzes a content file header to determine the compression encoding type or sort). If the predetermined compression encoding scheme is used, the audio decoder unit 174 skips decoding and compression encoding of the audio data and outputs the compression encoded audio data, included in the moving-image content, directly to the packet sending unit 176.

On the other hand, if the encoding scheme of the audio data included in the moving-image content is not the predetermined compression encoding scheme, the audio decoder unit 174 once decodes the audio data and outputs the decoded audio signal to an audio encoder unit 175.

The audio encoder unit 175 performs compression encoding of the output signal from the audio decoder unit 174 using the predetermined compression encoding scheme and outputs the compression encoded audio data to the packet sending unit 176.

The packet sending unit 176 receives the compression encoded result output from the image encoder unit 186, and the compression encoded audio data output from the audio encoder unit 175 or from the audio decoder unit 174, creates a packet for each piece of data, stores the data in the payload of the packet, and then sends the packet to the SGSN/GGSN apparatus 190.

The thin client server apparatus 110 may also be configured to connect, not to the web server apparatus 100, but to a content delivery server and read a user-desired content file or stream from the content delivery server.

In this exemplary embodiment, the SGSN/GGSN apparatus 190 may also be divided into the SGSN apparatus and the GGSN apparatus for arrangement on the network.

Figure 4:
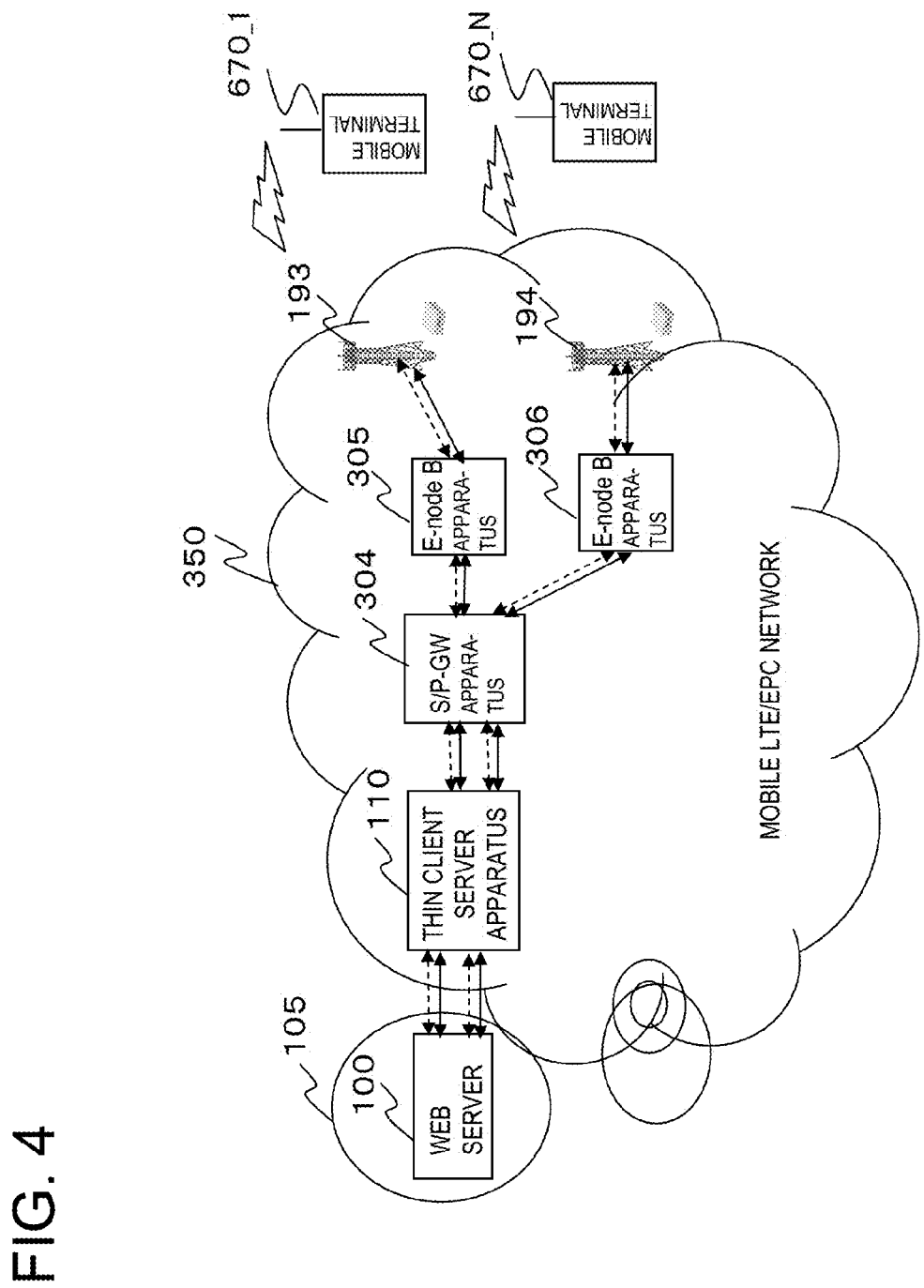
FIG. 4 is a diagram illustrating the configuration of a second exemplary embodiment of the present invention.

Next, the following describes a configuration of a second exemplary embodiment of the present invention. FIG. 4 is a diagram illustrating the configuration of the second exemplary embodiment of the present invention. In FIG. 4, the same reference numeral is given to an element that performs the same operation as that of an element in FIG. 1 and the further description of that element will be omitted. Referring to FIG. 4, this exemplary embodiment is different from the exemplary embodiment in FIG. 1 in that a mobile terminal 670 connects to an E-NodeB (Enhanced-NodeB) apparatus 305 or 306 via a mobile LTE/EPC network 350. The mobile terminal 670 connects to a thin client server apparatus 110 via an S/P-GW (Serving-Gateway/Packet Data Network Gateway) apparatus 304 (packet forwarding apparatus). In LTE/EPC, the S-GW is an LTE (and 3G)-compatible gateway node that forwards user data. The P-GW is a gateway node that performs interconnection with a service network (packet data network), which is not a core network, such as IMS (IP Multimedia Subsystem) that provides voice services and s forth to a packet network.

The configuration of this exemplary embodiment makes possible much faster packet forwarding than the configuration of the mobile network shown in FIG. 1.

The E-NodeB apparatus 305 or 306 uses LTE technologies to perform much faster packet transmission in the radio segment between the mobile terminal 670 and the E-NodeB apparatus than before.

The S/P-GW apparatus 304 and the thin client server apparatus 110 are connected via the IP protocol. Therefore, the thin client server apparatus 110 in FIG. 1 may be used without change for connection with the S/P-GW apparatus 304.

The S/P-GW apparatus 304 receives a packet via TCP/IP (Transmission Control Protocol/Internet Protocol) or UDP/IP (User Datagram Protocol/Internet Protocol), or a file forwarded using those protocols, from the thin client server apparatus 110, converts the protocol to GTP-U (GPRS Tunneling Protocol-User Plane)/TCP/IP or GTP-U/UDP/IP protocol and, after that, outputs the compression encoded bit stream or file to the E-NodeB apparatus 305 or 306.

The E-NodeB apparatus 305 or 306 converts the protocol to PDCP/RLC (Packet Data Convergence Protocol/Radio Link Control) protocol and sends the packet or the file to the mobile terminal 670.

It is of course possible to employ the configuration of the first exemplary embodiment or the configuration of the second exemplary embodiment or a combination of those configurations.

In the exemplary embodiments described above, SIP (Session Initiation Protocol) or SDP (Session Description Protocol) may also be used as the instruction signal from a mobile terminal.

It is also possible for the thin client server apparatus 110 to acquire the type and ability information from a mobile terminal to identify the image/audio data encoding scheme and the screen resolution and, based on the acquired information, set the compression encoded method, corresponding to the mobile terminal, as the predetermined compression encoding scheme.

According to the exemplary embodiments described above, when a new service is introduced by the operator, the new service can be introduced by updating the application software in the thin client server apparatus 110 installed on the network. The ability to compression encode image data and audio data using the encoding scheme corresponding to the decoding method of an existing mobile terminal eliminates the need to purchase a new mobile terminal or modify the existing mobile terminal each time a new service is introduced.

According to the present invention, even if a new compression encoding scheme is introduced into the field of content compression encoding thanks to the advances in codec technology, the server side hides moving-image content or content that includes audio, thus eliminating the need to change the interface with a mobile terminal. This allows the user to continue to use an existing terminal without modifying it.

The disclosure of Patent Literature given above is hereby incorporated by reference into this specification. The exemplary embodiments and examples may be changed and adjusted in the scope of the entire disclosure (including claims) of the present invention and based on the basic technological concept. In the scope of the claims of the present invention, various disclosed elements may be combined and selected in a variety of ways. That is, it is apparent that the present invention includes various modifications and changes that may be made by those skilled in the art according to the entire disclosure, including claims, and technological concepts thereof.

REFERENCE SIGNS LIST

100 Web server apparatus
105 Internet
110, 310 Thin client server apparatus
150 Mobile network
170_1, 170_N, 670_1, 670_N Mobile terminal
173 Control signal sending/receiving unit
174 Audio decoder unit
175 Audio encoder unit
176 Packet sending unit
180 Image decoder unit
181 Screen capture unit
186 Image encoder unit
190 SGSN/GGSN apparatus
193, 194 Base station apparatus
195, 196 RNC apparatus
211_1, 211_N Virtual client unit
304 S/P-GW apparatus
305, 306 E-NodeB apparatus
350 Mobile LTE/EPC network

The invention claimed is:

1. A communication system, comprising:
   a packet forwarding apparatus including a packet switching unit provided on a mobile network;
   first to Nth mobile terminals, where N is an integer equal to or larger than 2; and
   a server apparatus including first to Nth virtual client units, wherein the server apparatus is configured to include a plurality of virtual machines to operate respectively as the first to Nth virtual client units, the first to Nth virtual client units being connected respectively to the first to Nth mobile terminals via the packet forwarding apparatus on the mobile network,
   wherein each of the virtual client units is configured to:
      receive instruction information from the mobile terminal via the packet forwarding apparatus,
      run an application, based on the instruction information, to generate a screen and compression encodes a part or whole of the screen using an image encoder,
      once decode an audio signal, associated with the application or a content file, and compression encode a part or whole of the decoded audio signal again using a predetermined audio encoder, and
      stores the compression encoded result in a packet and sends the packet to the packet forwarding apparatus; and
   wherein the mobile terminal is configured to receive the packet from the server apparatus via the packet forwarding apparatus on the mobile network, decode the compression encoded result stored in the packet, using a screen decoder and displays a screen, and decode the compression encoded result using an audio decoder and reproduces the decoded result.

2. The communication system according to claim 1, wherein the mobile network is a mobile packet network or a mobile LTE (Long Term Evolution)/EPC (Evolved Packet Core) network.

3. A server apparatus comprising:
first to Nth virtual client units,
wherein:
N is an integer equal to or larger than 2,
the server apparatus is configured to include a plurality of virtual machines to operate respectively as the first to Nth virtual client units,
the first to Nth virtual client units connected respectively to first to Nth mobile terminals via a packet forwarding apparatus including a packet switching unit on a mobile network, and wherein
each of the virtual client units is configured to:
receive instruction information from the mobile terminal via the packet forwarding apparatus,
run an application, based on the instruction information, to generate a screen and compression encodes a part or whole of the screen using an image encoder,
once decode an audio signal, associated with the application or a content file, and compression encode a part or whole of the decoded audio signal again using a predetermined audio encoder, and
store the compression encoded result in a packet and sends the packet to the packet forwarding apparatus.

4. A communication method for use in a system where a server is configured to include a plurality of virtual machines to operate respectively as first to Nth (N is an integer equal to or larger than 2) virtual client units connected respectively to first to Nth mobile terminals via a packet forwarding apparatus including a packet switching unit on a mobile network, the method comprising: by each of the virtual client units of the server apparatus,
receiving instruction information from the mobile terminal via the packet forwarding apparatus;
running an application, based on the instruction information, to generate a screen and compression encoding a part or whole of the screen using an image encoder;
once decoding an audio signal, associated with the application or a content file, and compression encoding a part or whole of the decoded audio signal again using a predetermined audio encoder; and
storing the compression encoded result in a packet and sending the packet to the packet forwarding apparatus,
the method further comprising: by the mobile terminal,
receiving the packet from the server apparatus via the packet forwarding apparatus on the mobile network; decoding the compression encoded result, stored in the packet, using a screen decoder and displaying a screen; and decoding the compression encoded result using an audio decoder and reproducing the decoded result.

5. The communication method according to claim 4, wherein, based on the instruction information, the control signal sending/receiving unit of the server apparatus connects to a content information source to acquire the content, the content information source including at least one of a web server and a content delivery server.

6. The communication method according to claim 4, wherein the mobile network is a mobile packet network or a mobile LTE (Long Term Evolution)/EPC (Evolved Packet Core) network.

7. A communication system, comprising:
a server apparatus connected to a plurality of mobile terminals via a packet forwarding apparatus on a mobile network,
wherein, for each of the mobile terminals, the server apparatus comprises:
a control signal sending/receiving unit that receives instruction information from the mobile terminal via the packet forwarding apparatus and, based on the instruction information, acquires corresponding content;
an image decoder unit that decodes compression encoded image data of the content acquired by the control signal sending/receiving unit;
a screen capture unit that captures a part or whole of a decoded screen with a predetermined resolution;
an image encoder unit that compression encodes the image data, captured by the screen capture unit, using a predetermined compression encoding scheme;
an audio decoder unit that determines whether a compression encoded audio signal, included in the content, is compression encoded using the predetermined compression encoding scheme, decodes the audio signal in case the compression encoding scheme is not the predetermined compression encoding scheme, and skips the decoding and the compression encoding of the audio signal and sends the audio signal to a packet sending unit in case the compression encoding scheme is the predetermined compression encoding scheme;
an audio encoder unit that compression encodes the audio signal, decoded by the audio decoder unit, using the predetermined compression encoding scheme; and
the packet sending unit that packetizes the image data, compression encoded using the predetermined compression encoding scheme, and the audio signal, compression encoded using the predetermined compression encoding scheme and sends a packet signal to the packet forwarding apparatus, and
wherein the mobile terminal:
receives the packet from the server apparatus via the packet forwarding apparatus on the mobile network,
decodes image data, stored in the packet and compression encoded using the predetermined compression encoding scheme, using an image decoder of the mobile terminal and
decodes an audio signal, compression encoded using the predetermined compression encoding scheme, using an audio decoder of the mobile terminal.

8. A server apparatus connected to a plurality of mobile terminals via a packet forwarding apparatus on a mobile network, the server apparatus comprising, for each of the mobile terminals:
a control signal sending/receiving unit that receives instruction information from the mobile terminal via the packet forwarding apparatus and, based on the instruction information, acquires corresponding content;
an image decoder unit that decodes compression encoded image data of the content acquired by the control signal sending/receiving unit;
a screen capture unit that captures a part or whole of a screen, decoded by the image decoder, with a predetermined resolution;
an image encoder unit that compression encodes the image data, captured by the screen capture unit, using a predetermined compression encoding scheme;
an audio decoder unit that:
determines whether an audio signal, included in the content, is compression encoded using the predetermined compression encoding scheme,
once decodes the audio signal if the compression encoding scheme is not the predetermined compression encoding scheme, and
skips the decoding and the compression encoding of the audio signal and sends the audio signal to a packet sending unit if the compression encoding scheme is the predetermined compression encoding scheme;

an audio encoder unit that compression encodes the audio signal, decoded by the audio decoder unit, using the predetermined compression encoding scheme; and the packet sending unit that stores the image data, compression encoded using the predetermined compression encoding scheme, and the audio signal, compression encoded using the predetermined compression encoding scheme, in a packet and sends the packet to the packet forwarding apparatus.

9. A communication method in which a server apparatus is connected to a plurality of mobile terminals via a packet forwarding apparatus on a mobile network, the method comprising, by the server apparatus, for each of the mobile terminals:

(a) receiving instruction information from the mobile terminal via the packet forwarding apparatus;

(b) acquiring corresponding content based on the instruction information;

(c) decoding compression encoded image data of the acquired content;

(d) capturing a part or whole of a decoded screen with a predetermined resolution;

(e) compression encoding the captured image data using a predetermined compression encoding scheme;

(f) determining whether a compression encoded audio signal, included in the content, is compression encoded using the predetermined compression encoding scheme, once decoding the audio signal in case the compression encoding scheme is not the predetermined compression encoding scheme and compression encoding the decoded audio signal using the predetermined compression encoding scheme, and skipping the decoding and the compression encoding of the audio signal in case the compression encoding scheme is the predetermined compression encoding scheme; and (g) storing the image, compression encoded using the predetermined compression encoding scheme, and the audio signal, compression encoded using the predetermined compression encoding scheme, in a packet and sending the packet to the packet forwarding apparatus, the method further comprising: by the mobile terminal, receiving the packet via the mobile network; decoding the image data, stored in the packet and compression encoded using the predetermined compression encoding scheme, and then displaying a screen; and decoding the audio signal, compression encoded using the predetermined compression encoding scheme, and reproducing the decoded audio signal.

10. The communication system according to claim 7, wherein the server apparatus constitutes a thin client server with the mobile terminal as a thin client, wherein the server apparatus comprises first to Nth (N is an integer equal to or larger than 2) virtual client units, the first to Nth virtual client units connected respectively to first to Nth mobile terminals via the packet forwarding apparatus, each of the virtual client units comprising:

the control signal sending/receiving unit, the image encoder unit, the screen capture unit, the image decoder unit, the audio encoder unit, the audio encoder unit, and the packet sending unit.

11. The communication system according to claim 7, wherein, based on the instruction information, the control signal sending/receiving unit of the server apparatus connects to a content information source to acquire the content, the content information source including at least one of a web server and a content delivery server.

12. The server apparatus according to claim 8, wherein the server apparatus constitutes a thin client server with the mobile terminal as a thin client, wherein the server apparatus comprises:

first to Nth (N is an integer equal to or larger than 2) virtual client units, the first to Nth virtual client units connected respectively to first to Nth mobile terminals via the packet forwarding apparatus, each of the virtual client units comprising the control signal sending/receiving unit, the image decoder unit, the screen capture unit, the image encoder unit, the audio decoder unit, the audio encoder unit, and the packet sending unit.

13. The server apparatus according to claim 8, wherein the control signal sending/receiving unit connects to a content information source to acquire the content, the content information source including at least one of a web server and a content delivery server.

14. The communication method according to claim 9, wherein the server apparatus constitutes a thin client server with the mobile terminal as a thin client, wherein the server apparatus comprises first to Nth (N is an integer equal to or larger than 2) virtual client units, the first to Nth virtual client units connected respectively to first to Nth mobile terminals via the packet forwarding apparatus, each of the virtual client units performing processing (a) to (g) for each of the mobile terminals.

15. The communication system according to claim 7, wherein the mobile network is a mobile packet network or a mobile LTE (Long Term Evolution)/EPC (Evolved Packet Core) network.

16. The communication system according to claim 10, wherein the mobile network is a mobile packet network or a mobile LTE (Long Term Evolution)/EPC (Evolved Packet Core) network.

17. The communication system according to claim 11, wherein the mobile network is a mobile packet network or a mobile LTE (Long Term Evolution)/EPC (Evolved Packet Core) network.

* * * * *